United States Patent
Grgic et al.

(10) Patent No.: US 7,853,336 B2
(45) Date of Patent: Dec. 14, 2010

(54) DYNAMIC VERSIONING UTILIZING MULTIPLE CONTROLLER ENGINE INSTANCES TO LIMIT COMPLICATIONS

(75) Inventors: Richard J. Grgic, Painsville, OH (US); Subbian Govindaraj, Solon, OH (US); Kenwood H. Hall, Hudson, OH (US); Robert J. Kretschmann, Bay Village, OH (US); Charles M. Rischar, Chardon, OH (US); Raymond J. Staron, Chagrin Falls, OH (US); David A. Vasko, Solon, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 169 days.

(21) Appl. No.: 11/738,787

(22) Filed: Apr. 23, 2007

(65) Prior Publication Data
US 2008/0208365 A1 Aug. 28, 2008

Related U.S. Application Data

(63) Continuation-in-part of application No. 11/679,380, filed on Feb. 27, 2007, now Pat. No. 7,778,713, and a continuation-in-part of application No. 11/679,394, filed on Feb. 27, 2007, now Pat. No. 7,684,876.

(51) Int. Cl.
*G05B 19/18* (2006.01)
*G05B 11/01* (2006.01)
*G05B 15/00* (2006.01)
*G06F 19/00* (2006.01)

(52) U.S. Cl. .................. 700/11; 700/2; 700/17; 700/19; 700/20; 700/83; 702/183

(58) Field of Classification Search ............. None
See application file for complete search history.

(56) References Cited

U.S. PATENT DOCUMENTS

| 5,142,469 | A | * | 8/1992 | Weisenborn | ............ 700/17 |
| 5,796,603 | A | | 8/1998 | Hodorowski | |
| 5,826,244 | A | | 10/1998 | Huberman | |
| 5,875,461 | A | | 2/1999 | Lindholm | |
| 5,887,029 | A | | 3/1999 | Husted et al. | |
| 5,949,674 | A | | 9/1999 | Song et al. | |

(Continued)

OTHER PUBLICATIONS

OA mailed Feb. 25, 2009 for U.S. Appl. No. 11/686,406, 29 pages.

(Continued)

*Primary Examiner*—Charles R Kasenge
*Assistant Examiner*—Sunray R Chang
(74) *Attorney, Agent, or Firm*—Turocy & Watson LLP; R. Scott Speroff; John M. Miller

(57) ABSTRACT

The claimed subject matter provides a system and/or method that facilitates deploying data within an industrial environment. A controller can execute with a real-time operating system such that the controller can include two or more controller engine instances executing as processes on the controller. An update component that can dynamically deploy a portion of data to the industrial environment, the portion of data can be isolated within a controller engine instance for testing prior to exposing such portion of data outside the controller engine instance execution space.

25 Claims, 12 Drawing Sheets

U.S. PATENT DOCUMENTS

| | | | |
|---|---|---|---|
| 5,970,243 | A | 10/1999 | Klein |
| 5,971,581 | A * | 10/1999 | Gretta et al. .................. 700/83 |
| 6,055,370 | A | 4/2000 | Brown et al. |
| 6,268,853 | B1 * | 7/2001 | Hoskins et al. ............... 700/83 |
| 6,338,130 | B1 | 1/2002 | Sinibaldi |
| 6,373,836 | B1 | 4/2002 | Deryugin et al. |
| 6,453,460 | B1 * | 9/2002 | Keyes ........................ 717/108 |
| 6,615,092 | B2 | 9/2003 | Bickely et al. |
| 6,735,764 | B2 | 5/2004 | Nakai |
| 6,816,746 | B2 | 11/2004 | Bickely et al. |
| 6,882,890 | B2 | 4/2005 | Horn et al. |
| 6,901,446 | B2 | 5/2005 | Chellis et al. |
| 6,922,681 | B2 | 7/2005 | Fromherz et al. |
| 6,947,798 | B2 | 9/2005 | Bronikowski et al. |
| 7,039,740 | B2 | 5/2006 | Glasco et al. |
| 7,065,714 | B1 * | 6/2006 | Theel et al. ................. 715/781 |
| 7,111,306 | B1 * | 9/2006 | Laemmle et al. ............ 719/319 |
| 7,139,618 | B2 | 11/2006 | Danz et al. |
| 7,257,620 | B2 | 8/2007 | Lo |
| 7,272,815 | B1 | 9/2007 | Eldridge et al. |
| 7,374,524 | B2 | 5/2008 | McCormick |
| 7,472,387 | B2 | 12/2008 | Nakano |
| 2002/0129085 | A1 | 9/2002 | Kubala et al. |
| 2002/0194417 | A1 | 12/2002 | Suzuki et al. |
| 2003/0163508 | A1 * | 8/2003 | Goodman ................... 709/100 |
| 2004/0117535 | A1 * | 6/2004 | Schaftlein et al. ........... 710/301 |
| 2004/0260408 | A1 | 12/2004 | Scott et al. |
| 2005/0024102 | A1 * | 2/2005 | Kondo ........................ 327/110 |
| 2005/0028137 | A1 | 2/2005 | Evans et al. |
| 2005/0202808 | A1 * | 9/2005 | Fishman et al. ............. 455/419 |
| 2006/0005171 | A1 | 1/2006 | Ellison |
| 2006/0041328 | A1 | 2/2006 | McCormick |
| 2006/0092861 | A1 | 5/2006 | Corday et al. |
| 2006/0150174 | A1 * | 7/2006 | Abe et al. ................... 717/168 |
| 2006/0178757 | A1 | 8/2006 | Grgic et al. |
| 2006/0200257 | A1 | 9/2006 | Kirste et al. |
| 2007/0044066 | A1 | 2/2007 | Meijer et al. |
| 2007/0173959 | A1 * | 7/2007 | Chandhoke ................. 700/40 |
| 2008/0066019 | A1 | 3/2008 | Worek et al. |
| 2008/0090586 | A1 | 4/2008 | Engelhart |
| 2008/0109471 | A1 | 5/2008 | Subbian et al. |
| 2008/0125877 | A1 | 5/2008 | Miller et al. |

OTHER PUBLICATIONS

OA mailed Mar. 20, 2009 for U.S. Appl. No. 11/679,394, 37 pages.
OA mailed Mar. 9, 2009 for U.S. Appl. No. 11/695,758, 33 pages.
OA mailed Mar. 19, 2009 for U.S. Appl. No. 11/733,357, 34 pages.
OA mailed Mar. 20, 2009 for U.S. Appl. No. 11/679,380, 41 pages.
OA dated Mar. 20, 2009 for U.S. Appl. No. 11/733,390, 35 pages.
OA dated Oct. 7, 2009 for U.S. Appl. No. 11/679,380, 38 pages.
OA dated Aug. 20, 2009 for U.S. Appl. No. 11/686,406, 31 pages.
OA dated Oct. 19, 2009 for U.S. Appl. No. 11/695,758, 32 pages.
OA dated Aug. 18, 2009 for U.S. Appl. No. 11/738,784, 38 pages.
OA dated Oct. 19, 2009 for U.S. Appl. No. 11/733,357, 38 pages.
OA dated Oct. 16, 2009 for U.S. Appl. No. 11/733,390, 41 pages.
Foley. "Modify MicroLogix Online." Feb. 2006, A-B Journal, vol. 13, No. 1, abstract, pp. 1-2.
Johnson, et al. "OS Partitioning for Embedded Systems" Feb. 2, 2006; QNX Software Systems, pp. 1-9.
Johnson. Lowering the Development Costs of Industrial Control Systems through Software Partitioning. Aug. 15, 2006; QNX Software Systems, pp. 1-9.
OA dated Apr. 14, 2010 for U.S. Appl. No. 11/733,390, 67 pages.
OA dated Feb. 23, 2010 for U.S. Appl. No. 11/738,784, 35 pages.
Office Action dated May 24, 2010 for U.S. Appl. No. 11/695,727, 37 pages.
Office Action dated Jun. 24, 2010 for U.S. Appl. No. 11/745,023, 51 pages.
Office Action dated Jun. 3, 2010 for U.S. Appl. No. 11/695,758, 54 pages.
Hardin, Davis S; "Crafting a JAVA Virtual Machin in Silicon"; Mar. 2001; IEEE Xplore; IEEE Instrumatation & Mearsurement Magazine; pp. 54-56.
Hassapis, George; "Sift-testing of Industrial control systems programmed in IEC 1131-3 languages"; 2000; ISA Transactions vol. 39 pp. 345-355.

* cited by examiner

DYNAMIC VERSIONING UTILIZING MULTIPLE CONTROLLER ENGINE INSTANCES TO LIMIT COMPLICATIONS

CROSS REFERENCE TO RELATED APPLICATION(S)

This continuation-in-part application claims the benefit of U.S. patent application Ser. No. 11/679,380 filed on Feb. 27, 2007, entitled "CONSTRUCTION OF AN INDUSTRIAL CONTROL SYSTEM USING MULTIPLE INSTANCES OF INDUSTRIAL CONTROL ENGINES" and U.S. patent application Ser. No. 11/679,394 filed on Feb. 27, 2007, entitled "DYNAMIC LOAD BALANCING USING VIRTUAL CONTROLLER INSTANCES." The entireties of such applications are incorporated herein by reference.

TECHNICAL FIELD

The claimed subject matter relates generally to hardware controllers within an industrial automation environment and, more particularly, to optimize the execution of such hardware controllers.

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases that are accessible by system/process/project managers on a factory floor. For instance, sensors and associated software can detect a number of instances that a particular machine has completed an operation given a defined amount of time. Further, data from sensors can be delivered to a processing unit relating to system alarms. Thus, a factory automation system can review collected data and automatically and/or semi-automatically schedule maintenance of a device, replacement of a device, and other various procedures that relate to automating a process.

While various advancements have been made with respect to automating an industrial process, utilization and design of controllers have been largely unchanged. In more detail, industrial controllers have been designed to efficiently undertake real-time control. For instance, conventional industrial controllers receive data from sensors and, based upon the received data, control an actuator, drive, or the like. These controllers recognize a source and/or destination of the data by way of a symbol and/or address associated with source and/or destination. More particularly, industrial controllers include communications ports and/or adaptors, and sensors, actuators, drives, and the like are communicatively coupled to such ports/adaptors. Thus, a controller can recognize device identity when data is received and further deliver control data to an appropriate device.

Unfortunately, traditional controllers employed within automation industrial environments have fallen behind recent technological advances to which the automation industry has maintained stride for stride. Conventional controllers are rigid and inflexible such that hardware and/or software associated therewith must be specifically tailored to a particular control engine and a one-to-one ratio between controllers and control engines must be maintained. With the vast number of controllers and/or control engines within industrial environments and each having respective code/data, management of the industrial environment can be an overwhelming and time-consuming task. Moreover, there exists a plurality of updates and/or firmware upgrades for the various devices, controllers, applications, software, components, control engines, processes, and the like within an industrial environment. Identification and employment of updates and/or firmware upgrades can be meticulous and overwhelming in light of the multitude of entities within the industrial environment. Regardless of the amount of entities, there still is a high risk of possible complication and/or conflict within the industrial environment upon deployment of updates and/or firmware upgrades.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The subject innovation relates to systems and/or methods that facilitate automatically deploying dynamic updates and/or portions of data to an industrial environment. An update component can deploy a portion of data within the industrial environment in real time and implement testing on such portion of data prior to exposure to the entire industrial environment. The update component can initiate isolated testing and/or experimentation related to a portion of data targeted for deployment within the industrial environment by utilizing such portion of data within a controller engine instance and respective dedicated execution space. By isolating the portion of data within the controller engine instance execution space, the industrial environment can be protected from possible conflicts, errors, compatibility issues, etc. The portion of data that can be deployed can be, for instance, most any suitable data related to an industrial environment, versioning data, firmware data, updates, patches, updated software, updated firmware, code, a portion of data that corrects a defect, disparate data in comparison to existing data within the environment, etc.

The update component can further utilize a detect component that can evaluate data within the industrial environment in order to facilitate identifying whether a portion of data within the industrial environment can be updated and/or whether a portion of data is applicable to be deployed therewith. In particular, the detect component can evaluate the industrial environment and identify a portion of applicable data from a data resource, wherein the portion of data can be dynamically deployed on an isolated controller engine instance for testing prior to exposure to the entire industrial environment. In other aspects of the claimed subject matter, methods are provided that facilitate dynamically exposing a portion of data to an industrial environment upon completion of a test and/or experiment.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed and such subject matter is intended to include all such aspects and their equivalents. Other advantages and novel features will become apparent from the following detailed description of the invention when considered in conjunction with the drawings.

DETAILED DESCRIPTION

Figure 1:
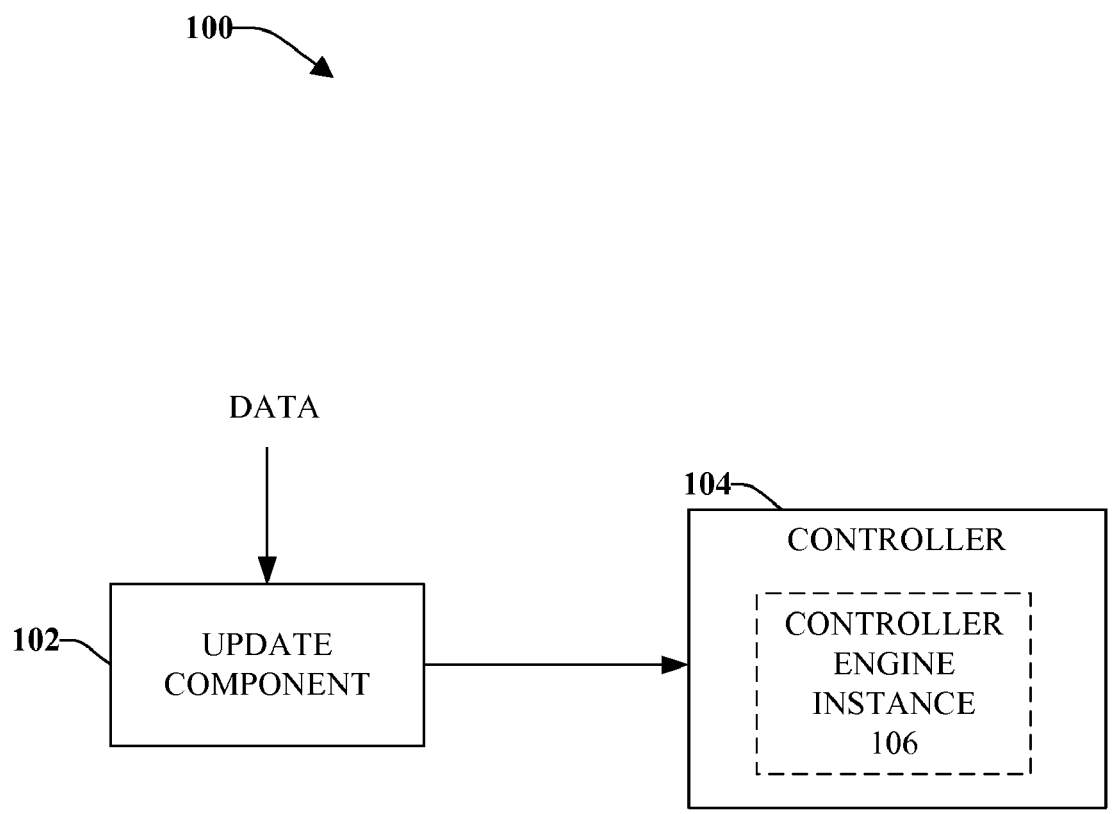
FIG. 1 illustrates a block diagram of an exemplary system that facilitates automatically providing dynamic updates to an industrial environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component," "controller," and "system" are intended to refer to a computer-related entity, either hardware, a combination of hardware and software, software, or software in execution. For example, a component may be, but is not limited to a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, aspects of the claimed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

Now referring to the drawings, FIG. 1 illustrates a system 100 that facilitates automatically providing dynamic updates to an industrial environment. The system 100 can include an update component 102 that can dynamically provide a portion of data to an industrial environment and, in particular, a controller 104 and/or a controller engine instance 106. The portion of data can be related to an entity within an industrial environment such as, but not limited to, a controller (e.g., the controller 104), a controller engine instance (e.g., the controller engine instance 106), a device (not shown), a portion of a process (not shown), a portion of an application (not shown), and the like. It is to be appreciated that the portion of data can be most any suitable data related to an industrial environment and/or any associated entity such as, but not limiting to, versioning data, firmware data, updates, patches, updated software, updated firmware, code, a portion of data that corrects a defect, disparate data in comparison to existing data within the environment, etc. Upon receipt of the portion of data, the update component 102 can dynamically utilize the portion of data with the industrial environment. Moreover, the update component 102 can isolate and implement the portion of data within a specific controller engine instance so as to enable a testing period and/or an experimental trial-run. The update component 102 can isolate the portion of data to the specific controller engine instance to ensure complications and/or errors are minimal and/or tolerable prior to exposing such portion of data outside the specific controller engine instance.

The update component 102 can allow the portion of data to be tested and/or experimented within a controller engine instance that has dedicated execution space separate and isolated from the industrial environment. Therefore, each portion of data (e.g., version data, test data, update data, updates, patches, data manipulations, etc.) to be implemented by the update component 102 can be isolated for testing and/or approval such that one portion of data being tested/approved within a controller engine instance can not affect data outside such controller engine instance. For example, a version update can be received for the industrial environment, wherein the update component 102 can isolate such installation and implementation to a particular controller engine instance. Most any suitable tests, experiments, preliminary findings, etc. can be utilized within the isolated controller engine instance prior to exposing such version update to the environment.

It is to be appreciated that the portion of data can be retrieved by a user, an entity (e.g., a group, a facility, an enterprise, a business, a factory, a collection of machines, a collection of computers, a collection of users, a programmer, most any combination thereof, etc.), a machine, a computer, a disparate industrial environment, a third-party, a vendor, the Internet, a network, a disparate network not affiliated with the industrial environment, an evaluation of an industrial environment to ascertain data needs, and/or most any suitable component or user that can provide a portion of data that can be utilized within the industrial environment. For example, a vendor can transmit a particular patch that is available for a device. The update component 102 can receive such patch for the device and implement such upgrade on an isolated controller engine instance to enable testing/experimenting. Once such test and/or experiment period is complete, the following can be employed: the patched data can be dynamically handed-off to a non-isolated controller engine instance that is exposed to the industrial environment; the portion of data and/or patch can be directly installed and exposed to the industrial environment with most any changes and/or manipulations from experiments/tests; and/or the isolated controller engine instance can be dynamically exchanged and/or swapped with an exposed and comparable controller engine instance within the industrial environment.

It is to be appreciated that the controller 104 can contain software components and hardware components having inputs and/or outputs that can be utilized in connection with automating an industrial manufacturing device/process. Moreover, it is to be appreciated and understood that the controller 104 can be most any suitable portion of hardware and/or portion of software that receives and/or transmits inputs and/or outputs in order to control at least one of a device or a portion of a process. It is to be noted that a controller (e.g., a programmable logic controller (PLC), etc.) can be a dedicated piece of hardware that is self contained or in the case of a "soft PLC" a piece of software that runs on a computer and provides PLC-like control. For instance, in the case of a soft PLC, the soft PLC can be partitioned to employ most any suitable soft PLC engine instances on a real time operating system (e.g., rather than a soft PLC controller executing on an operating system as non-real time), wherein each soft PLC engine instance can handle a portion of what the soft PLC engine handled, controlled, etc.

It is to be noted that the controller 104 can include various computer or network components such as servers, clients, communications modules, mobile computers, wireless components, control components and so forth that are capable of interacting across a network (not shown). Similarly, the term PLC or controller as used herein can include functionality that can be shared across multiple components, systems, and or networks. For example, one or more controllers 104 (e.g., PLCs, etc.) can communicate and cooperate with various network devices across a network. This can include substantially any type of control, communications module, computer, I/O device, sensor, Human Machine Interface (HMI)) that communicate via a network which includes control, automation, and/or public networks. The controller 104 can also communicate to and control various other devices such as Input/Output modules including Analog, Digital, Programmed/Intelligent I/O modules, other programmable controllers, communications modules, sensors, output devices, and the like.

A network can include public networks such as the Internet, Intranets, and automation networks such as Common Industrial Protocol (CIP) networks including DeviceNet, ControlNet and EtherNet/IP. Other networks include Ethernet, DH/DH+, Remote I/O, Fieldbus, Foundation Fieldbus, Modbus, Profibus, wireless networks, serial protocols, and so forth. In addition, the network devices can include various possibilities (e.g., hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

In another aspect in accordance with the subject innovation, the controller 104 can be implemented in the industrial automation environment (e.g., an industrial environment, an automation environment, an environment, an automation industry, etc.) which employs a hierarchical representation of devices and/or processes. The hierarchy can be based at least in part upon the physical location of devices/processes (e.g., a region of a factory can have several defined sub-regions, which in turn can comprise sub-regions), standards associated with industry, such as ISA S95, ISA S88, and the like, proprietary hierarchy that is provided by an enterprise, or any other suitable hierarchy (discussed in further detail in FIG. 10). It is to be appreciated that the controller software can be distributed as a component of a disparate application (e.g., a larger application). For instance, a controller component can be included on a welder (e.g., a robot welder, an automated welder, etc.), wherein the controller can execute within the context of the welder (e.g., executing within the context of the robot welder). Moreover, the proprietary standard can include customer defined hierarchies as well as industrial automation company defined hierarchies (e.g., a company can provide tools to which customers can provide their own hierarchies).

Figure 2:
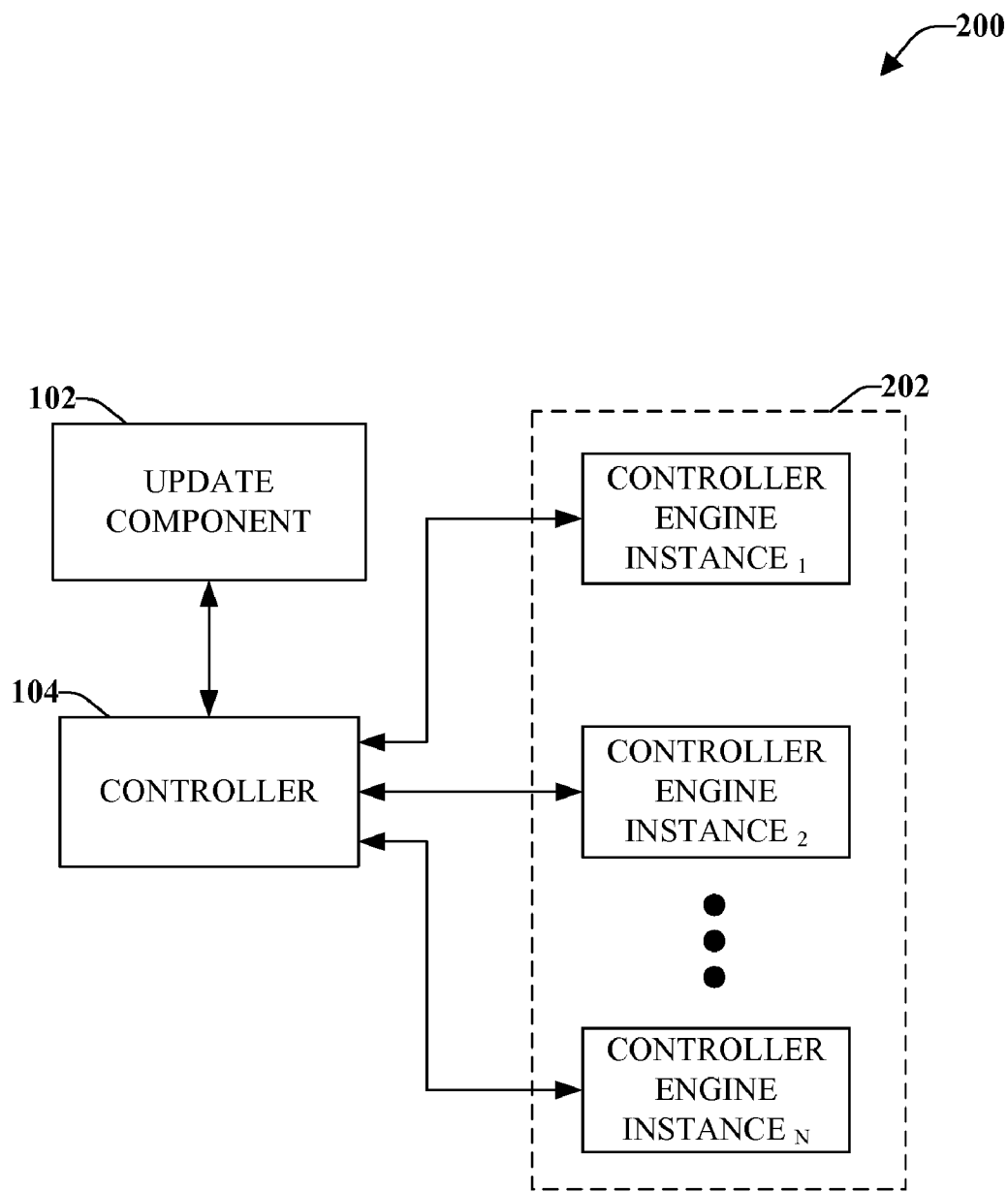
FIG. 2 illustrates a block diagram of an exemplary system that facilitates employing one or more controller engine instances related to a controller.

FIG. 2 illustrates a system 200 that facilitates employing one or more controller engine instances related to a controller. The system 200 can include the controller 104 that can generate at least one controller engine instance 202, wherein the controller engine instance 202 can execute on the controller 104 with a real time operating system (OS) to be utilized with automating/controlling an industrial manufacturing device and/or process. It is to be appreciated most any suitable operating system can be utilized by the subject innovation (e.g., a proprietary operating system, off-the-shelf, a third-party operating system, an open source operating system, a real time operating system (OS), etc.). The controller 104 can utilize most any suitable number of controller engine instances 202 such as controller engine instance 1 to controller engine instance N, where N is a positive integer. In other words, the controller 104 can implement a plurality of controller engine instances 202, wherein each controller engine instance can handle controlling a device and/or portion of a process within an industrial automation environment. It is to be appreciated that the system 200 can enable the creation of a new instance of an engine based on a set of pre-defined parameters. In other words, no user intervention is needed to start a new instance of the engine.

For example, an industrial automation environment can include a controller that can be utilized with a first process, a second process, and a device. Conventionally, a controller and a controller engine are restricted to a one-to-one ratio such that there is only one controller engine per physical hardware controller. With such restrictions, additional hardware controllers needed to be introduced to enable multiple controller engines. However, the claimed subject matter implements a controller engine in a substantially similar manner to a process implemented on a hardware controller in the fact that multiple controller engines (e.g., controller engine instance) can execute on the hardware controller (e.g., multiple processes can execute on a controller). By executing multiple controller engine instances on the controller, each particular controller engine instance can handle at least a portion of a process and/or a device within the industrial automation environment. For instance, the controller can employ a controller engine instance to handle the first process, a controller engine instance to control the second process, and/or a controller engine instance to handle/control the device. It is to be appreciated that the controller can implement most any suitable number of controller engine instances. In another example, a first controller engine instance can be utilized for the first process and the second process while a disparate controller engine instance can be utilized for the device. In other words, the various number of controller engine instances can be managed to control, handle, and/or execute a device and/or process in most any suitable combination.

In another example, an industrial automation environment can include controller A, controller B, and controller C. In one scenario, controller engine instances can execute on a corresponding parent/host controller. However, there can be distributed controller engine instances (e.g., a controller engine instance with more than one host and/or parent controller) such that more than one controller can handle and/or host a controller engine instance. Thus, controller A and controller B can share the hosting duties for a controller engine instance. By sharing and/or distributing the execution of the controller engine instance to more than one controller, the full potential of controllers and respective controller engine instances can be reached.

In another example, a controller engine instance executing on a first controller can be seamlessly handed off to a disparate controller based upon a deterioration of the initial hosting controller (e.g., first controller). Furthermore, the controller engine instance can be shared and/or distributed to a disparate controller in light of a possible deterioration and/or problematic initial host controller. It is to be appreciated that the claimed subject matter is to include transferring, handing off, sharing, etc. of a controller engine instance to a disparate controller based on a particular event/circumstance (e.g., controller health, controller characteristic, restructure, update, security, upgrade, error, firmware, dependability, detail related to an industrial automation environment, etc.). It is to be appreciated that the system 200 can enable the creation of controller engine instances without user intervention. Thus, the creation and/or generation of the controller engine instances to execute on the real time operating system (OS) corresponding to the controller can be automatic and seamless.

The system 200 can further utilize the update component 102 to allow a portion of data to be tested in isolation within at least one of the plurality of controller engine instances 202. As discussed, the controller engine instances 202 can handle controlling a device and/or portion of a process within an industrial automation environment, wherein such devices and/or processes may require updates and/or replacement data such as, but not limited to, patches, upgrades, version updates, code updates, firmware, etc. The update component 102 can receive a portion of data related to a load (e.g., a device, a portion of a process, a portion of an application, etc.) to which such portion of data can be utilized (e.g., installed, executed, employed, etc.) within an isolated controller engine instance for testing/experimenting prior to exposing such portion of data outside the isolated controller engine instance (e.g., to the industrial environment). This can allow a secure and independent environment to which updates and/or other data changes (e.g., versioning data, patches, code updates, etc.) can be implemented with little negative repercussions the entire industrial environment.

Figure 3:
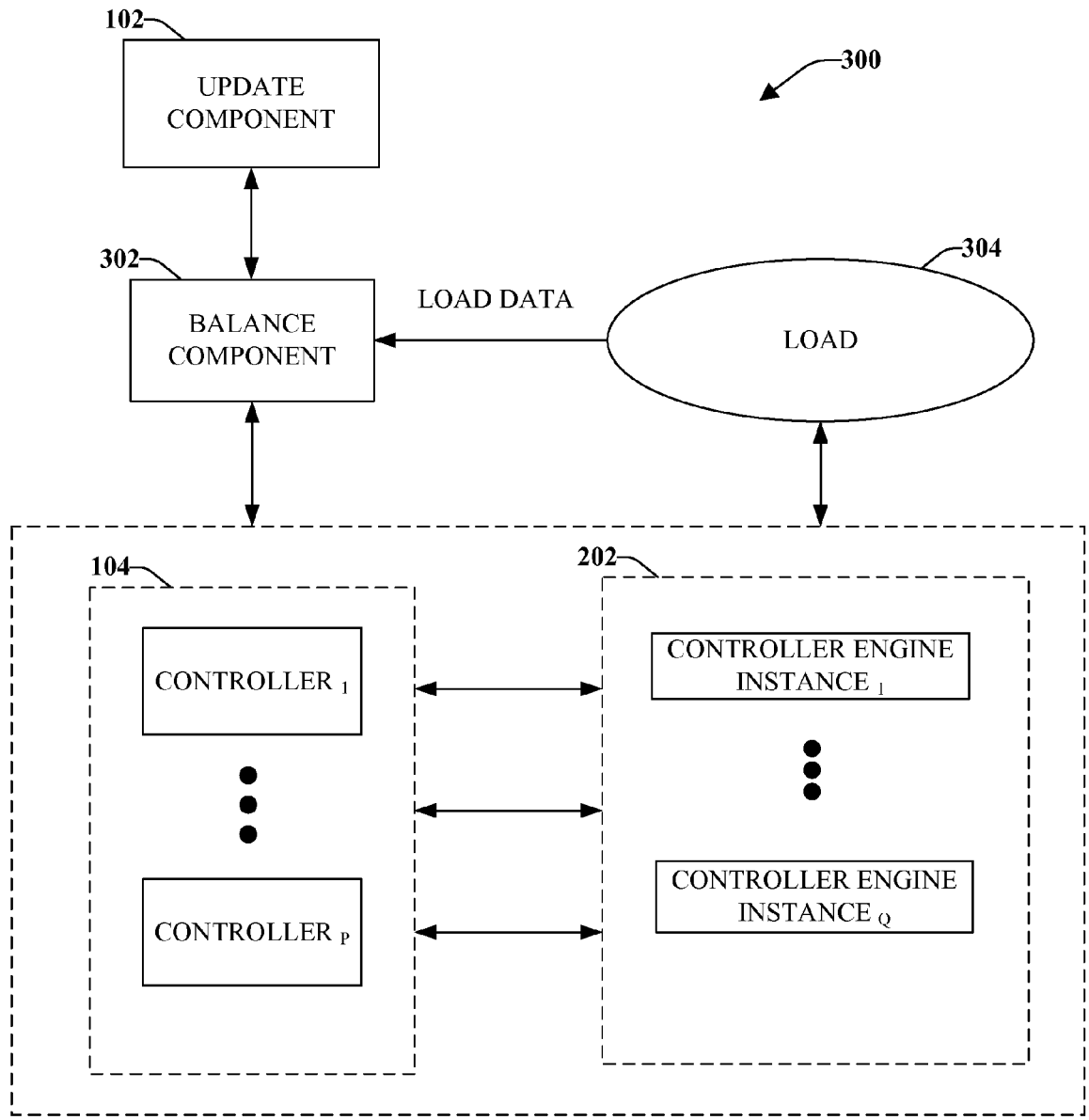
FIG. 3 illustrates a block diagram of an exemplary system that facilitates dynamically distributing a load amongst a plurality of controllers and/or a plurality of controller engine instances.

FIG. 3 illustrates a system 300 that facilitates dynamically distributing a load amongst a plurality of controllers and/or a plurality of controller engine instances. The system 300 can include a balance component 302 that can employ dynamic allocation of a portion of a load 304 to one or more controllers 104 and/or one or more controller engine instances 202 without user intervention. Generally, the balance component 302 can adjust a load assignment (e.g., load A is assigned to controller X, load B is assigned to controller Y, etc.) for controllers 104 (and respective controller engine instances 202) within an industrial automation environment without user intervention. Moreover, the balance component 302 can allow the distribution of most any suitable portion of the load 304 to most any suitable portion of the controllers 104 or most any suitable portion of controller engine instances 202. The examples and illustrations below associated with dynamic load distribution is intended to include distribution to a controller as well as distribution to a controller engine instance and the claimed subject matter is to include most any suitable combination of employing a controller and/or a controller engine instance.

For example, the load 304 can be partitioned into five (5) parts with five (5) controllers handling/controlling each part. In another example, the load 304 can be divided into four (4) pieces where a controller A can handle/control 2 pieces, controller B can handle/control 1 piece, and controller C can handle/control 1 piece. Still further, the load 304 can be divided into three (3) pieces where a host controller can include most any suitable number of controller engine instances that can handle/control the three (3) pieces accordingly (e.g., evenly distributed, percentage-based, processor-based percentage, resource availability-based, etc.). It is to be appreciated that the load 304 can be partitioned and/or distributed based on most any suitable manner such as, but not limited to, controller resources, controller engine instance resources, processor availability, processing capabilities, percentage based, functionality, importance, priority, security, location, source/origin, user preference, user-defined manner, relation to source code, etc. Furthermore, it is to be appreciated that the balance component 302 can distribute a portion of the load 304 to most any suitable number of controllers 104 such as $controller_1$ to $controller_p$, where P is a positive integer. Moreover, it is to be appreciated that the balance component 302 can distribute a portion of the load 304 to most any suitable number of controller engine instances 202 such as $controller\ engine\ instance_1$ to $controller\ engine\ instance_Q$, where Q is a positive integer regardless of the host controller (e.g., remote, local, resources, processing capabilities, etc.). Although a single balance component 302 is depicted, it is to be appreciated and understood that most any suitable number of balance components can be employed such that the balance component can be within each controller, a stand-alone component, and/or most any suitable combination thereof.

By evaluating at least one of the load 304 and/or the controllers 104, the balance component 302 can enable selftuning and/or dynamic distribution which optimizes and enhances controllers within industrial automation environments. Controllers within industrial automation environments typically have various characteristics and/or capabilities in relation to computation and/or processing ability. By evaluating such characteristics and/or the load 304, the system 300 greatly improves traditional techniques and/or mechanisms associated with controllers. It is to be appreciated that the load 304 can be most any suitable load related to an industrial environment such as, but not limited to, control related to a portion of a device within the industrial environment, control related to a portion of a process within the industrial environment, receipt of data related to the industrial environment, transmission of data related to the industrial environment, most any suitable processing within the industrial environment, etc. For instance, the balance component 302 can monitor and/or track most any suitable characteristic associated with the capability of the controllers 104 such as, but not limited to, processing ability, hard drive, processor speed, memory, networking capabilities, version, edition, hardware age, processor type, controller brand, controller functionality, controller make, controller model, available resources, capacity available, accessibility, frequency of use, processor consumption, memory consumption, controller embedded software (e.g., firmware), etc.

Furthermore, it is to be appreciated that communication between most any suitable controllers (and/or controller engine instances 202) handling/controlling a portion of the load 304 can be employed. Thus, the controllers 104 and/or controller engine instances 202 can communicate to each other in relation to the distribution of the load 304 therewith. Moreover, it is to be understood that the communication can be among most any suitable controller and/or controller engine instance associated with the system 300 and the communication need not be between controllers sharing the load 304. Thus, a system can include controller A, controller B, and controller C such that a load is shared by controller A and controller B (e.g., no load on controller C, a disparate load on controller C, etc.). Controller C can communicate to controller A and/or controller B to notify of available processing resources/capabilities to which a portion of the load can then be shared by controller C. Furthermore, it is to be appreciated that the balance component 302 can receive such communications and re-distribute the allocation of the load 304 accordingly in real-time.

Moreover, the update component 102 can identify and implement a portion of data (e.g., an update, a patch, a portion of firmware, a portion of data, a code update, a data change, etc.) related to the load 304 in a seamless and dynamic manner. For instance, update data related to the load 304 can be identified, wherein the update component 102 can employ such updates in an isolated manner without affecting and/or disrupting the industrial environment. Particularly, the update component 102 can evaluate the load 304 and/or load data, controllers 104, the controller engine instances 202, and/or most any suitable data related to the industrial environment in order to provide relative and applicable data updates to the system 300. Thus, the update component 102 can interact with the balance component 302 in order to provide data updates associated with at least a portion of the load 304 within the industrial environment.

Figure 4:
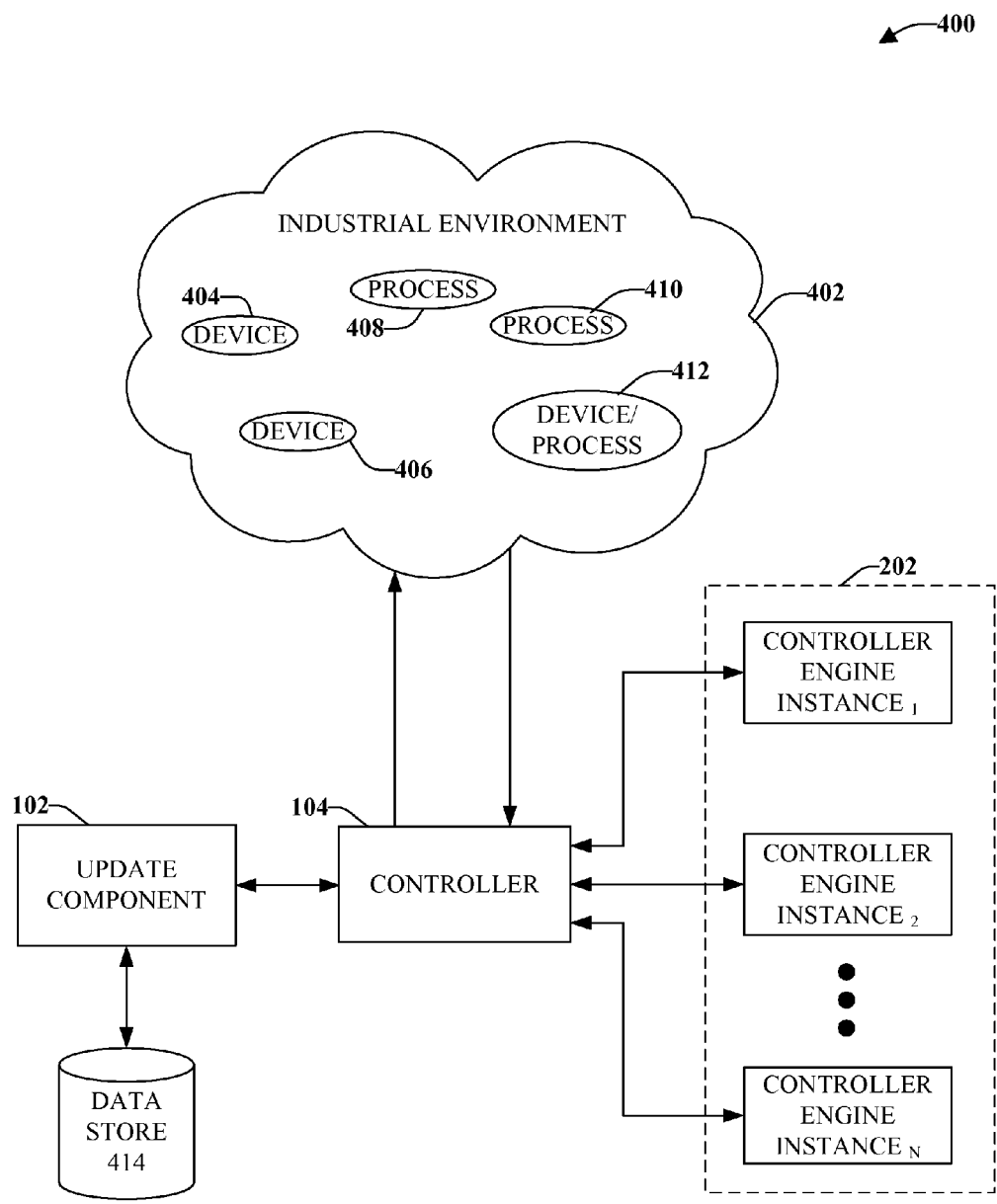
FIG. 4 illustrates a block diagram of an exemplary system that facilitates maintaining versioning related to entities within an industrial environment.

FIG. 4 illustrates a system 400 that facilitates maintaining versioning related to entities within an industrial environment. The update component 102 can provide dynamic data updates (e.g., firmware, data changes, updated data, code, application upgrades, versioning updates, etc.) to an industrial environment 402, wherein the data can be tested on an isolated controller engine instance prior to exposure to the entire industrial environment 402. In general, the industrial environment 402 can include a plurality of devices, processes, etc. and each with distinctive and respective data updates and/or possible data changes/updates. The update component 102 can provide a portion of data for most any suitable entity related to the industrial environment 402. For example, the industrial environment 402 can include most any suitable number of devices and/or process such as device 404, device 406, process 408, process 410, and/or device/process 412. It is to be appreciated that the devices and/or process within the industrial environment can be communicatively coupled to the system 400 by way of an intranet or other suitable network. Moreover, it is to be appreciated that the devices and/or processes within the network can communicate utilizing most any suitable technique (e.g., employing CIP but transmission of data can be accomplished using a technique not defined as a network). The device can be most any suitable device associated with an industrial automation environment such as, but not limited to, a physical device, a software device, an application, a virtual device, a PLC, a controller device, a furnace, a human machine interface (HMI), a computer, a disparate controller, a roller, a station, a welder, a scanner, a belt conveyor, a pump, a press, a fan, a heater, a switch, a sensor, a conveyor, a portion of firmware, a portion of an application, a portion of a process, a cooler, a valve, an electrical component, a drain, a photo eye, a robot, etc. Furthermore, the device and/or process can be controlled by the controller 104, at least one controller engine instance 202, a portion of a controller engine instance, and/or most any suitable combination thereof. It is to be appreciated that a controller can be executed as a component of a larger system can take part of the load sharing. For example, the controller can be executing as a component of the welder, wherein the controller may be capable of also interacting with the update component 102.

It is to be appreciated that the system 400 can be utilized in a hierarchically structured industrial environment. For example, the devices/processes 404-412 can be hierarchically structured to facilitate management of such devices within the industrial environment 402. The hierarchy can be based at least in part upon the physical location of devices (e.g., a region of a factory can have several defined sub-regions, which in turn can comprise sub-regions), standards associated with industry, such as ISA S95, ISA S88, and the like, proprietary hierarchy that is provided by an enterprise, or any other suitable hierarchy. For instance, a top portion of the hierarchy may be a plant, and a sub-level of the plant may be programmable logic controllers utilized within the plant, and a sub-level of the programmable logic controllers can be devices controlled by such controllers (discussed in more detail in FIG. 10). It is understood that this is but one example of a hierarchy, and is for illustrative purposes only.

Moreover, the system 400 can include a data store 414 that can store most any suitable data related to the update component 102, the controller 104, a controller engine instance 202, and/or most any suitable combination thereof. For example, the data store 414 can store device and/or controller data (e.g., make, model, brand, type, version, etc.), process data, device/controller characteristics (e.g., location, functionality, etc.), firmware/updates, current firmware/data, previously utilized firmware/data, existing firmware/data, a portion of firmware data, deployment status, firmware historic data, firmware historic deployment data, status of testing, test results, experiment results, conditions of testing/experiments, versioning data related to an entity, entity data, update data source/origin, historic data related to the industrial environment, historic data related to controller engine instance, controller data, most any suitable data related to a controller and/or a controller engine instance, health data related to a controller, transfer data, distribution data, etc. The data store 414 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), MRAM, a combination of NV memory with the access speeds of volatile memory, and Rambus dynamic RAM (RDRAM). The data store 414 of the subject systems and methods is intended to comprise, without being limited to, these and any other suitable types of memory. In addition, it is to be appreciated that the data store 414 can be a server, a database, a hard drive, and the like.

Figure 5:
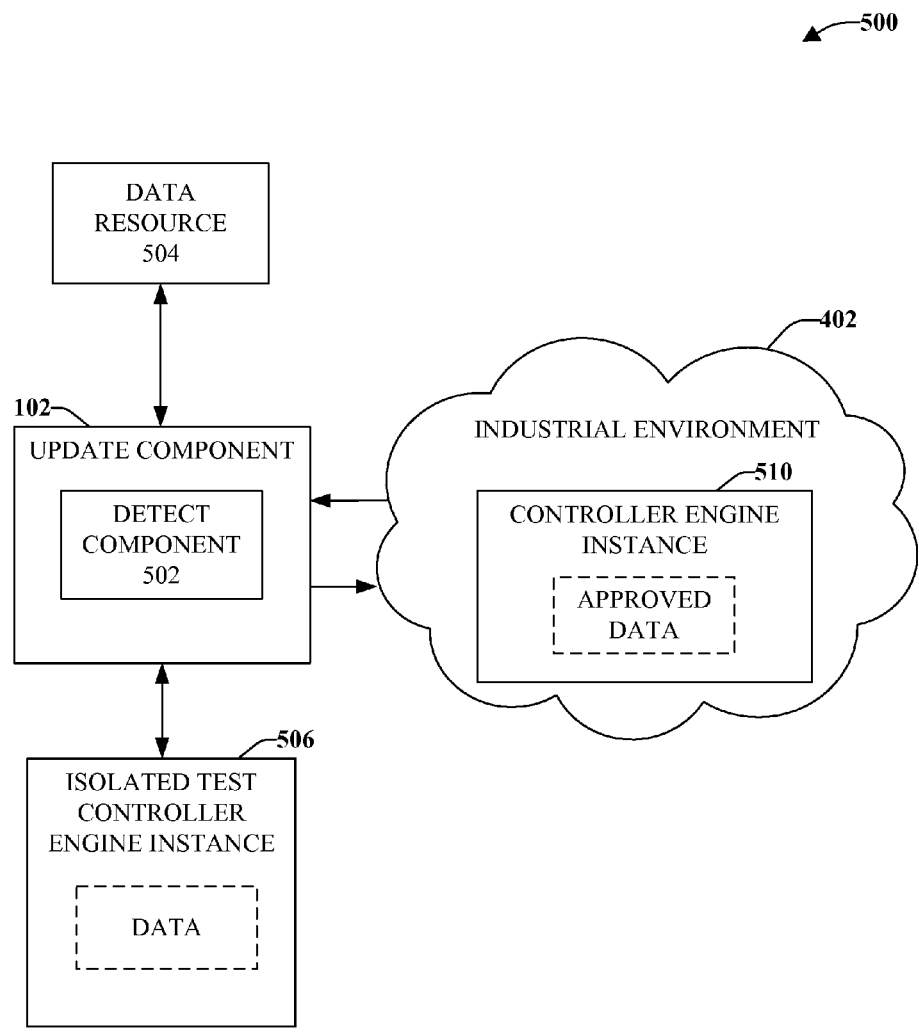
FIG. 5 illustrates a block diagram of an exemplary system that facilitates dynamically exposing a portion of data to an industrial environment upon completion of a test and/or experiment.

FIG. 5 illustrates a system 500 that facilitates dynamically exposing a portion of data to an industrial environment upon completion of a test and/or experiment. The system 500 can include the update component 102 that can provide a portion of data (e.g., an update, a patch, a firmware upgrade, a versioning update, a disparate portion of code/data, application updates, etc.) to an entity within the industrial environment 402 in real-time. In order to efficiently identify portions of applicable data for updates, the update component 102 can include a detect component 502. The detect component 502 can evaluate the industrial environment 402 and/or most any suitable entity associated with the industrial environment 402.

In particular, the detect component 502 can evaluate a plurality of entities associated with the industrial environment 402. In particular, the evaluation can detect brand, type, model, maker, vendor, serial number, digital signature, reference name, associated firmware/data on the entity, existing firmware/data on an entity, the existence of any portion of firmware/data on the entity, most any suitable characteristic associated with the entity to distinguish from a disparate entity to identify a portion of application update data (e.g., firmware, code, data, application data, patches, versions, etc.), etc. Based at least upon the evaluation of the industrial environment 402, the update component 102 can identify at least a portion of most any suitable applicable data such as, but not limited to, firmware, portion of software, portion of an application, portion of code related to the entity, a portion of data that corrects a defect, and/or disparate data (compared to existing data already included with the industrial environment 402), etc. Thus, the system 500 facilitates maintaining and/or ensuring the appropriate and current software/data is deployed on within the industrial environment 402.

The update component 102 can further utilize a data resource 504 that can provide at least a portion of data and/or firmware to be deployed to the industrial environment 402. It is to be appreciated that the data resource 504 can be at least one of a vendor, a third-party, a service, a third-party service, a service provider, a manufacturer, a device-maker, a process-maker, an application-maker, a company, a web-service, a website, a database, an email, a data store, a local service, a remote party, and/or most any suitable component/user that can provide a portion of data/firmware (e.g., data, updates, patches, versioning, application, code, data manipulations, etc.). For example, the detect component 502 can evaluate the industrial environment to identify an entity, wherein the update component 102 can utilize the data resource 504 to provide a portion of applicable data for the entity based on the evaluation.

The update component 102 can further test the portion of data by deploying such data within an isolated controller engine instance 506. The isolated controller engine instance 506 can include distinct and dedicated execution space (e.g., sand-boxed from the industrial environment 402) such that execution space outside such isolated controller engine instance 506 is unaffected. The portion of data can be tested and/or experimented to identify possible issues, errors, complications, etc. Upon completion of the testing and/or experimenting on the isolated test controller engine instance 506, the portion of data can be exposed outside the isolated controller engine instance 506. In one particular example, the update component 102 can identify a substantially similar controller engine instance that is to test the portion of data or generate a substantially similar controller engine instance that is to test the portion of data. It is to be appreciated that the following can be employed: the patched data can be dynamically handed-off to a non-isolated controller engine instance that is exposed to the industrial environment (e.g., controller engine instance 510 with approved data being utilized); the portion of data and/or patch can be directly installed and exposed to the industrial environment with most any changes and/or manipulations from experiments/tests; and/or the isolated controller engine instance can be dynamically exchanged and/or swapped with an exposed and comparable controller engine instance within the industrial environment (e.g., swapping the isolated controller engine instance 506 with the controller engine instance 510). However, it is to be appreciated that although the isolated controller engine instance 506 is not depicted within the industrial environment 402, the isolated controller engine instance 506 can be within the industrial environment 402 but still be include dedicated execution space that is contained therewith.

Figure 6:
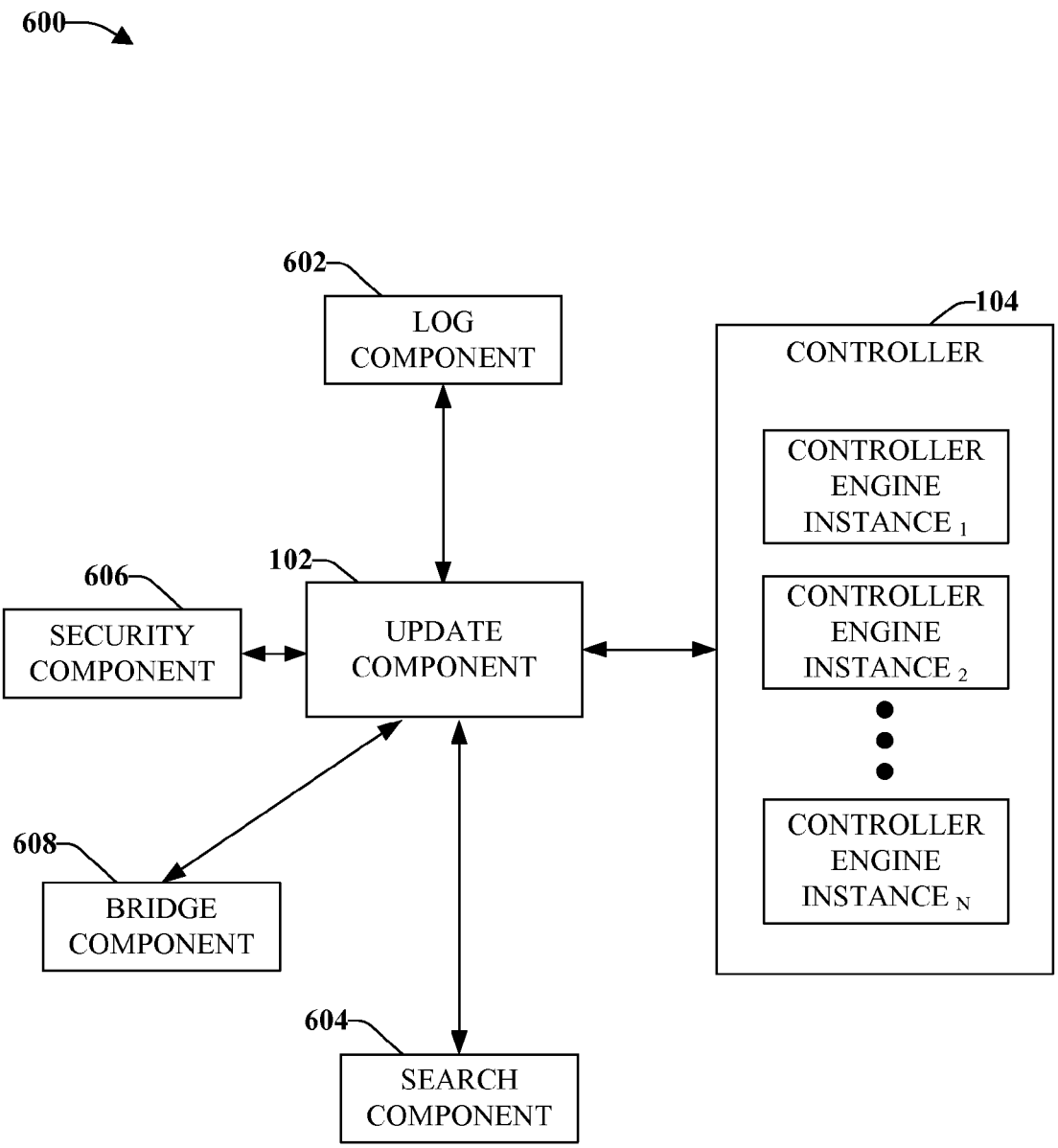
FIG. 6 illustrates a block diagram of an exemplary system that facilitates utilizing versioning data related to an industrial environment.

FIG. 6 illustrates a system 600 that facilitates utilizing versioning data related to an industrial environment. The system 600 can utilize a log component 602 that tracks data in accordance with the claimed subject matter. In particular, the log component 602 can track and/or monitor data related to data updates, data upgrades, versioning, data changes/manipulation, update/data origin, install data, experiment/test data, user data related to the system 600, security data, hierarchy data, and/or most any suitable data related to the controller, controller engine instance, device, process, code, etc. It is to be appreciated that the log component 602 can be a stand-alone component, incorporated into the update component 102, incorporated into the controller 104, incorporated into a controller engine instance, and/or any combination thereof. For example, if a user initiates a test for a first portion of data within an isolated controller engine instance, the log component 602 can track the user (e.g., via IP address, network address, user name, computer name, etc.), the date and time of test, the date and time of first portion data install, details of the test and/or portion of data, the reasoning for the test and/or portion of data, the controller hosting the controller engine instance, etc. Moreover, the log component 602 can store the logged entries in a data store (not shown).

The update component 102 can further utilize a search component 604 that facilitates querying any data associated with the system 600. The search component 604 allows a user and/or any component to query the system 600 in relation to update data, firmware, updates, patches, existing data status, versioning, test/experiment data, test/update initiator data (e.g., user/component that employs the ranking, time, date, reasoning, etc.), controller engine instance data, controller data within the industrial environment, processes, devices, applications, portions of code, etc. For instance, a user can query the system 600 utilizing the search component 604 to find update data for a specific controller engine instance associated with a particular controller within the Localville, Ohio plant. In another example, the search component 604 can allow a developer/user/entity (e.g., a computer, a machine, a corporation, a group, an individual, a controller, etc.) to provide all variable names associated with devices within sector 5, cell 6, and controlled by controller engine instance C executing on controller A associated with a particular version of firmware/data. It is to be appreciated that a plurality of searches and/or queries can be implemented by the search component 604 and the above examples are not to be limiting on the claimed subject matter. Moreover, it is to be appreciated that the search component 604 is depicted as a stand-alone component, but the search component 604 can be incorporated into the update component 102, incorporated into the controller 104, incorporated into a controller engine instance, a stand-alone component, and/or any combination thereof.

The update component 102 can further utilize a security component 606 that provides security to the system 600 to ensure data integrity and/or access in connection with the update component 102, the controller 104, a controller engine instance, the plurality of controller engine instances, and/or most any suitable combination thereof. In particular, the security component 606 can define security, authorization, and/or privileges in accordance with at least one of a pre-defined hierarchy, security level, username, password, access rights, data importance (e.g., more important data correlates with high security clearance), etc. For instance, a particular test/experiment within a controller engine instance can be a first security level with distinct security authorizations and/or privileges, while a disparate test/experiment within a disparate controller engine instance can have a second security level with disparate security authorizations and/or privileges. Thus, the security component 606 can provide granular security and/or privileges in relation to tests, experiments, update data, firmware, versioning, code, data, updates, patches, data manipulations, controller engine instance execution space, controllers, controller engine instances, devices, etc. It is to be appreciated that there can be various levels of security with numerous characteristics associated with each level and that the subject innovation is not limited to the above example. It is to be appreciated that security component 606 can be a stand-alone component, incorporated into the update component 102, incorporated into the controller 104, incorporated into a controller engine instance, and/or any combination thereof.

The update component 102 can further include a bridge component 608 that facilitates networking within an industrial automation environment. In other words, the bridge component 608 can act as a network bridge. It is to be appreciated that the bridge component 608 can be a stand-alone component, incorporated into the update component 102, incorporated into the controller 104, incorporated into a controller engine instance, and/or any combination thereof. Thus, data carried by disparate networks can be manipulated so that it conforms to a common network. Accordingly, the bridge component 608 can recognize a network protocol associated with received instructions related to the update component 102 and perform operations to convert such data so that it conforms to a pre-defined protocol. Upon such conversion, a mapping can be employed to convert the data so that it conforms to a hierarchically structured data model (rather than data models associated with flat namespaces). The mapping can thereafter provide hierarchically structured data to a requester of such data over a network, wherein the network conforms to the pre-defined protocol. For instance, the first network protocol can be at least one of Fieldbus, Profibus, Hart, Modbus, ASI-bus, and Foundation Fieldbus, while the second network protocol can be a Common Industrial Protocol (CIP). It is to be appreciated that the first network protocol and the second protocol can be both CIP or one be Hart and one be ASI-Bus.

Figure 7:
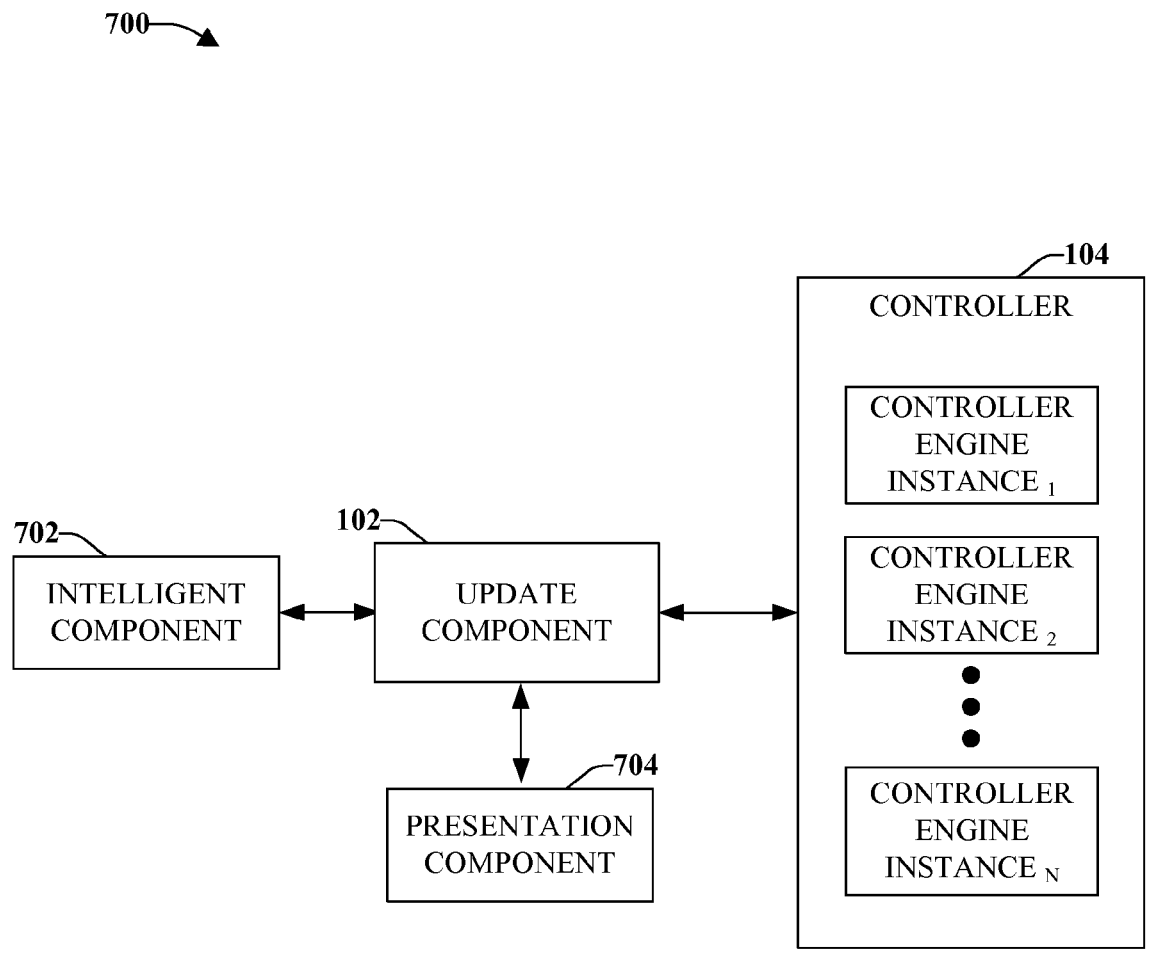
FIG. 7 illustrates a block diagram of an exemplary system that facilitates dynamically identifying and providing data to an entity related to an industrial environment.

FIG. 7 illustrates a system 700 that employs intelligence to facilitate dynamically identifying and providing data to an entity related to an industrial environment. The system 700 can include the update component 102 and the controller 104 with two or more controller engine instances that can all be substantially similar to respective controllers, instances, and components described in previous figures. The system 700 further includes an intelligent component 702. The intelligent component 702 can be utilized by the update component 102 to facilitate isolating data (e.g., update data, version data, data upgrades, patches, application changes, data changes, etc.) within a controller engine instance for testing/experimenting prior to exposing and/or deploying such data into an industrial environment. For example, the intelligent component 702 can infer entity data, entity make, entity model, entity type, entity characteristics, entity settings, entity brand, entity firmware, a portion of firmware applicability, applicability of firmware for a specific entity, a version of firmware, a version of an entity, test settings, experiment conditions, a deployment setting for firmware, a deployment timing, etc.

It is to be understood that the intelligent component 702 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, intelligent agents, and probabilistic classification models providing different patterns of independence can be employed. Classification as used herein also is inclusive of statistical regression that is utilized to develop models of priority.

A presentation component 704 can provide various types of user interfaces to facilitate interaction between a user and any component coupled to at least one of the update component 102, the controller 104, and/or a controller engine instance. As depicted, the presentation component 704 is a separate entity that can be utilized with update component 102. However, it is to be appreciated that the presentation component 704 and/or similar view components can be incorporated into the update component 102, a stand-alone unit, and/or most any suitable combination thereof. The presentation component 704 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to the update component 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels. It is to be further appreciated that the presentation component 704 can utilize bio sensing, biometrics (e.g., fingerprints, retina scan, iris scan, facial patters, hand measurement, etc.), and the like. Moreover, the presentation component 704 can present data to a non-human interfaces such as other machines.

Figure 8:
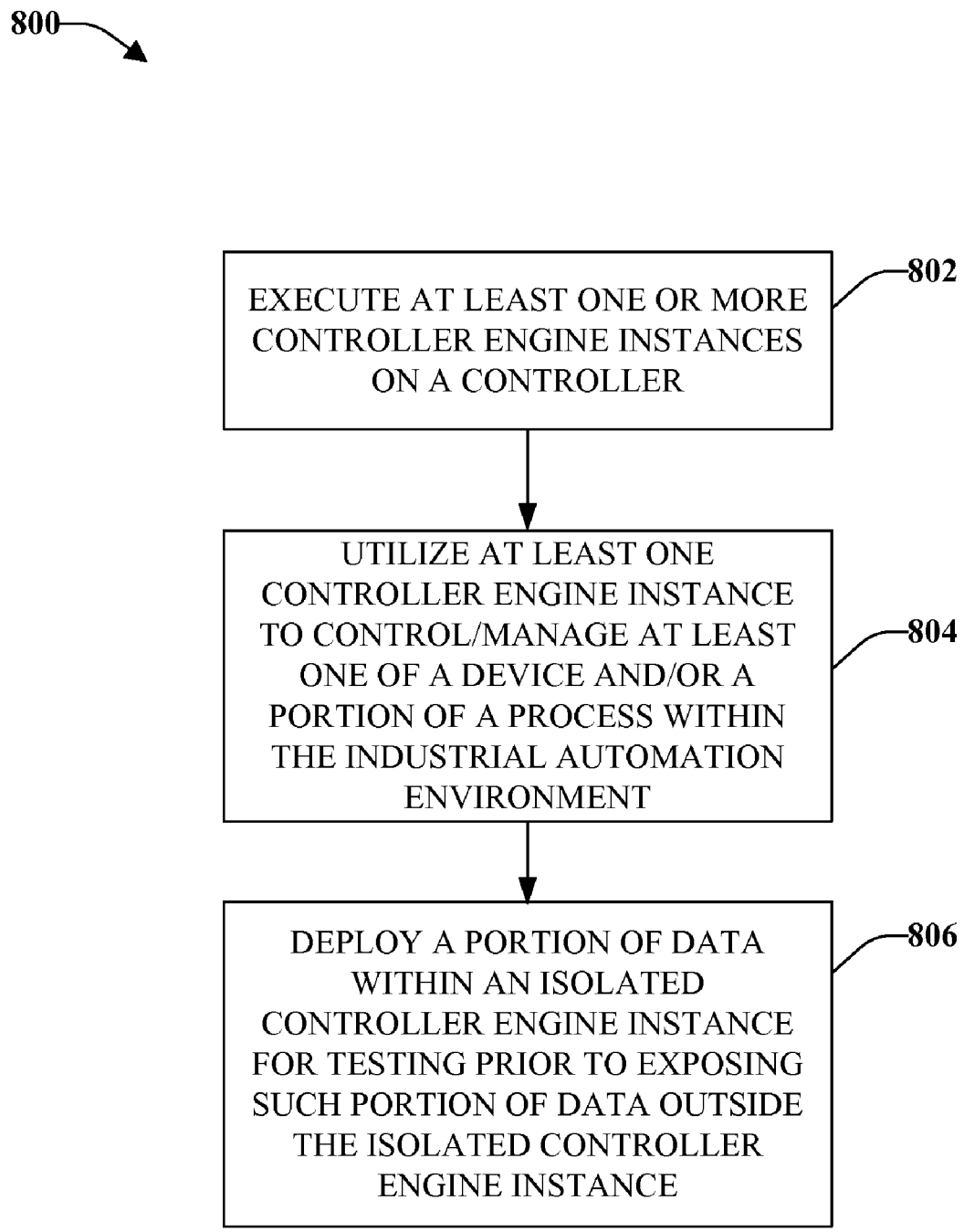
FIG. 8 illustrates an exemplary methodology for automatically providing dynamic updates to an industrial environment.
Figure 9:
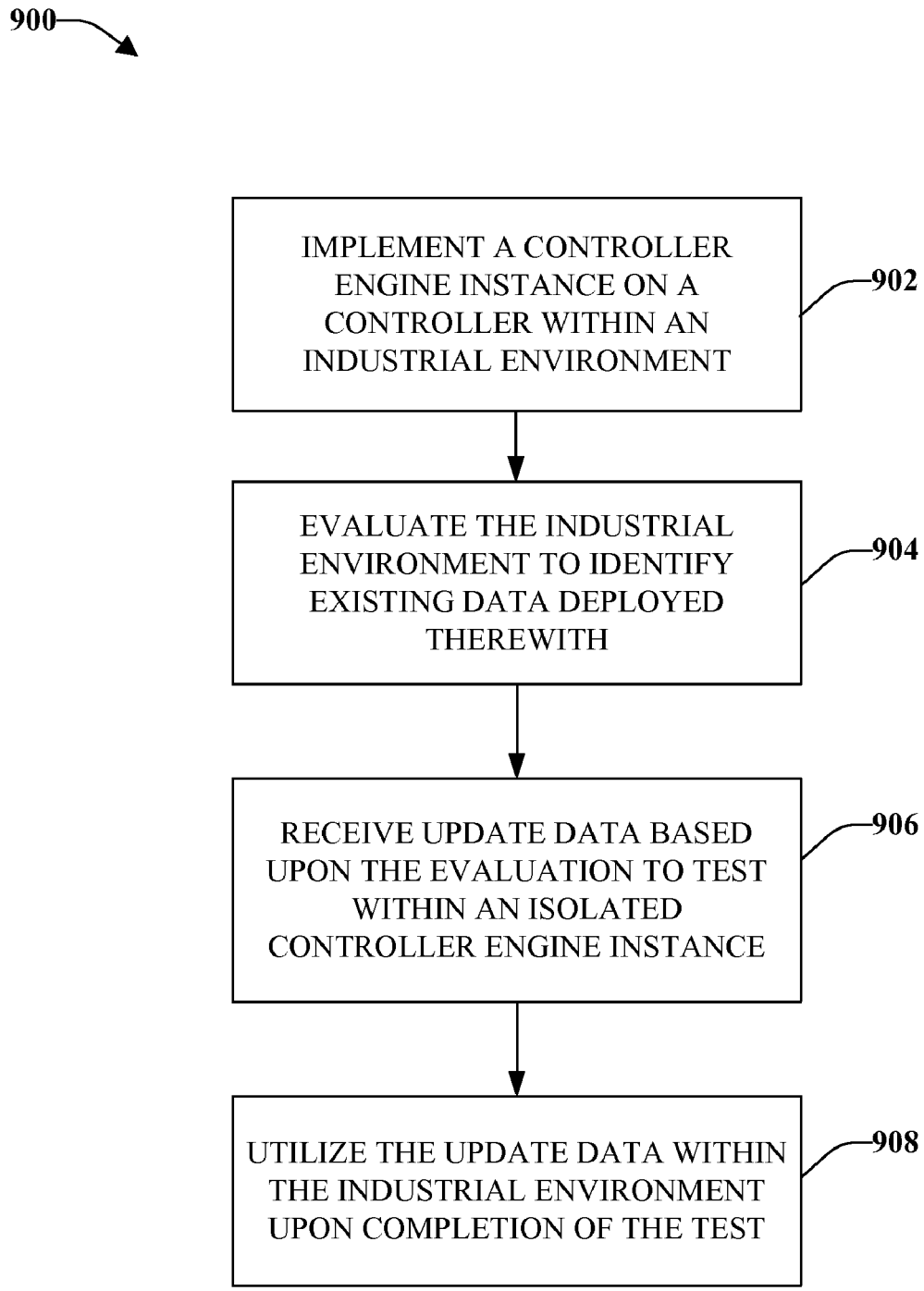
FIG. 9 illustrates an exemplary methodology that facilitates dynamically exposing a portion of data to an industrial environment upon completion of a test and/or experiment.

Referring to FIGS. 8-9, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 8 illustrates a methodology 800 for automatically providing dynamic updates to an industrial environment. At reference numeral 802, at least one or more controller engine instances can be executed on a controller within an industrial automation environment. The controller can have a real time operating system (OS), wherein such controller can be employed in an industrial automation environment. It is to be appreciated that the controller can contain software components and hardware components having inputs and/or outputs that can be utilized in connection with automating an industrial manufacturing device/process within the industrial automation environment. Moreover, it is to be appreciated and understood that the controller can be most any suitable portion of hardware and/or portion of software that receives and/or transmits inputs and/or outputs in order to control at least one of a device or a portion of a process. It is to be noted that a controller (e.g., a programmable logic controller (PLC), etc.) can be a dedicated piece of hardware that is self contained or in the case of a "soft PLC" a piece of software that runs on a computer and provides PLC-like control.

Furthermore, the controller can utilize most any suitable number of controller engine instances such as controller engine instance 1 to controller engine instance N, where N is a positive integer. Moreover, the claimed subject matter implements a controller engine instance in a substantially similar manner to a process implemented on a hardware controller in the fact that multiple controller engines (e.g., controller engine instance) can execute on the hardware controller (e.g., multiple processes can execute on a controller). It is to be appreciated that the one or more controller engine instances can be executed without user intervention (e.g., in an automatic and seamless manner without human assistance). At reference numeral 804, at least one controller engine instance can be utilized to control and/or manage at least one of a device or a portion of a process within the industrial automation environment. It is to be appreciated that some controller engine instances may be a pure computational engine (e.g., control modules that compute gas flow, etc.) and may not control any devices. In other words, the controller can implement a plurality of controller engine instances, wherein each controller engine instance can handle controlling a device and/or portion of a process within an industrial automation environment.

At reference numeral 806, a portion of data can be deployed within an isolated controller engine instance for testing prior to exposing such portion of data outside the isolated controller engine instance. It is to be appreciated that the portion of data can be related to an entity within the industrial environment such as, but not limited to, a controller, a controller engine instance, a device, a portion of a process, a portion of an application, and the like. Moreover, the portion of data can be most any suitable data related to an industrial environment and/or any associated entity such as, but not limiting to, versioning data, firmware data, updates, patches, updated software, updated firmware, code, a portion of data that corrects a defect, disparate data in comparison to existing data within the environment, etc. The portion of data can be isolated and implemented within a specific controller engine instance so as to enable a testing period and/or an experimental trial-run.

FIG. 9 illustrates a methodology 900 that facilitates dynamically exposing a portion of data to an industrial environment upon completion of a test and/or experiment. At reference numeral 902, a controller engine instance can be implemented on a controller within an industrial environment. The industrial environment (e.g., an industrial environment, an automation environment, an environment, an automation industry, etc.) can employ a hierarchical representation of devices and/or processes. The hierarchy can be based at least in part upon the physical location of devices/processes (e.g., a region of a factory can have several defined sub-regions, which in turn can comprise sub-regions), standards associated with industry, such as ISA S95, ISA S88, and the like, proprietary hierarchy that is provided by an enterprise, or any other suitable hierarchy.

At reference numeral 904, the industrial environment can be evaluated to identify existing data deployed therewith. In other words, the industrial environment can be evaluated to identify data utilized within the industrial environment and/or with various entities associated therein. At reference numeral 906, update data can be received and/or located based at least in part upon the evaluation, wherein such update data can be tested within an isolated controller engine instance. For example, the update data can be identified and/or located within a data resource and such data can be at least one of a vendor, a third-party, a service, a third-party service, a service provider, a manufacturer, a device-maker, a process-maker, an application-maker, a company, a web-service, a website, a database, an email, a data store, a local service, a remote party, and/or most any suitable component/user that can provide a portion of data/firmware (e.g., data, updates, patches, versioning, application, code, data manipulations, etc.).

At reference numeral 908, the update data can be utilized within the industrial environment upon completion of the test and/or simulation. For instance, the test and/or simulation can be monitored to identify reactions and/or complications associated with the update data being deployed within the isolated controller engine instance. Upon approval and/or completion of such testing and/or experimenting, the update data can be exposed to the industrial environment. In particular, the update data can be employed by the following: the update data can be dynamically handed-off to a non-isolated controller engine instance that is exposed to the industrial environment; the update data can be directly installed and exposed to the industrial environment with most any changes and/or manipulations from experiments/tests; and/or the isolated controller engine instance can be dynamically exchanged and/or swapped with an exposed and comparable controller engine instance within the industrial environment.

Figure 10:
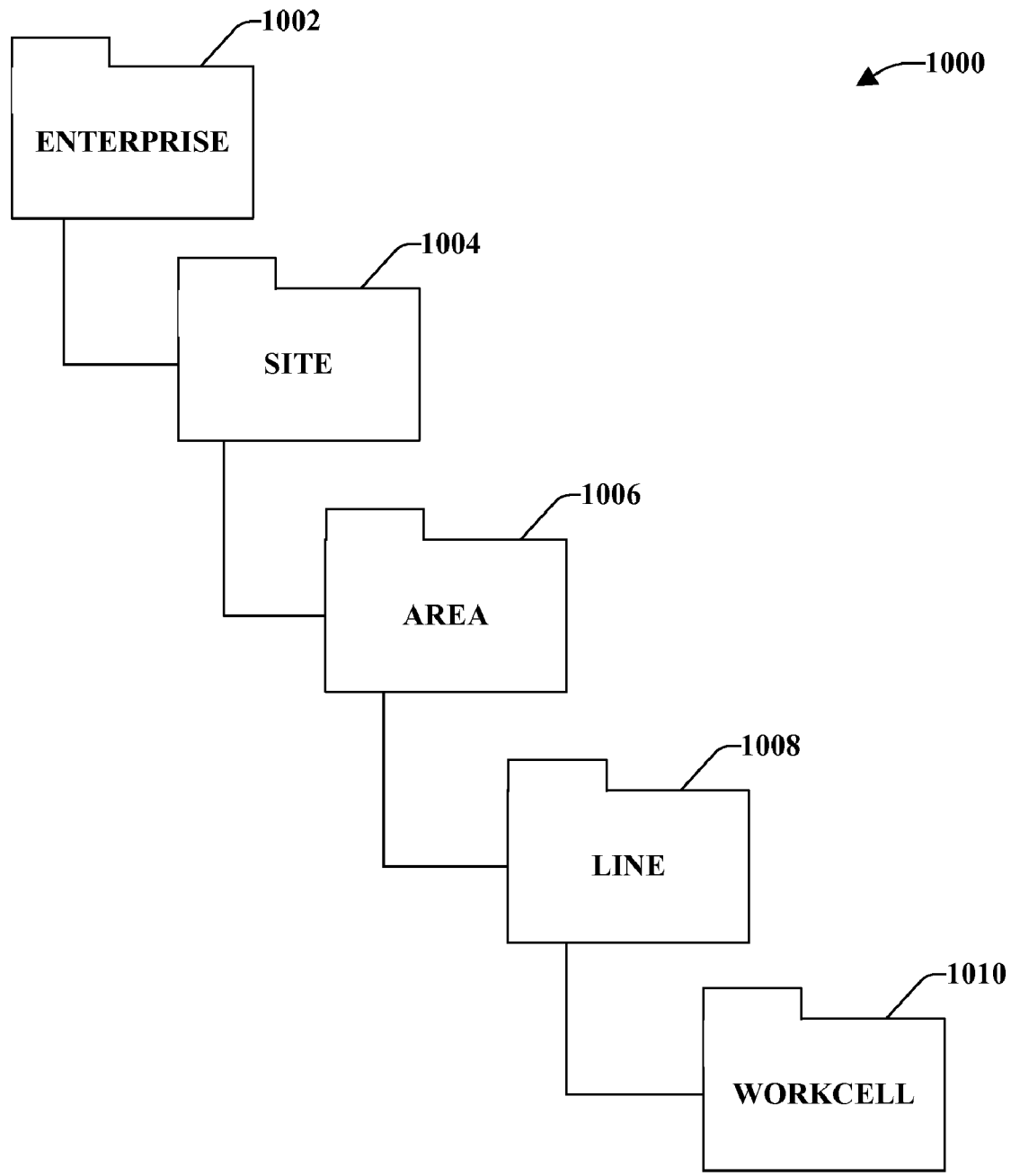
FIG. 10 illustrates a block diagram of an exemplary data structure that represents a hierarchical structure of an industrial automation system.

Referring now to FIG. 10, an exemplary hierarchical structure 1000 which can be utilized in connection with the hierarchically structured data model (e.g., hierarchical representation of devices, processes, etc.) alluded to herein is illustrated. For example, the data model can facilitate utilizing nested structures, thereby mitigating deficiencies associated with data models that employ flat namespaces. The structure 1000 includes an enterprise level 1002, where a particular enterprise can be represented within data structured in accordance with a hierarchical data model. Beneath the enterprise level 1002 can be a site level 1004, so that a particular factory (site) within an enterprise can be represented within a data packet. Beneath the site level 1004 an area level 1006 can exist, which specifies an area within the factory that relates to the data. A line level 1008 can lie beneath the area level 1006, wherein the line level 1008 is indicative of a line associated with particular data. Beneath the line level 1008 a workcell level 1010 can exist, thereby indicating a workcell associated with the data. Utilizing a nested, hierarchical data model, PLCs can become more aware of data associated therewith. Furthermore, the hierarchy 1000 can be customized by an owner of such hierarchy. For instance, more granular objects/levels can be defined within the hierarchy 1000 in relation to the various assets associated therewith. It is to be appreciated that the structure 1000 is for exemplary purposes only and a plurality of levels can be implemented with a multitude of entities can be employed.

Figure 11:
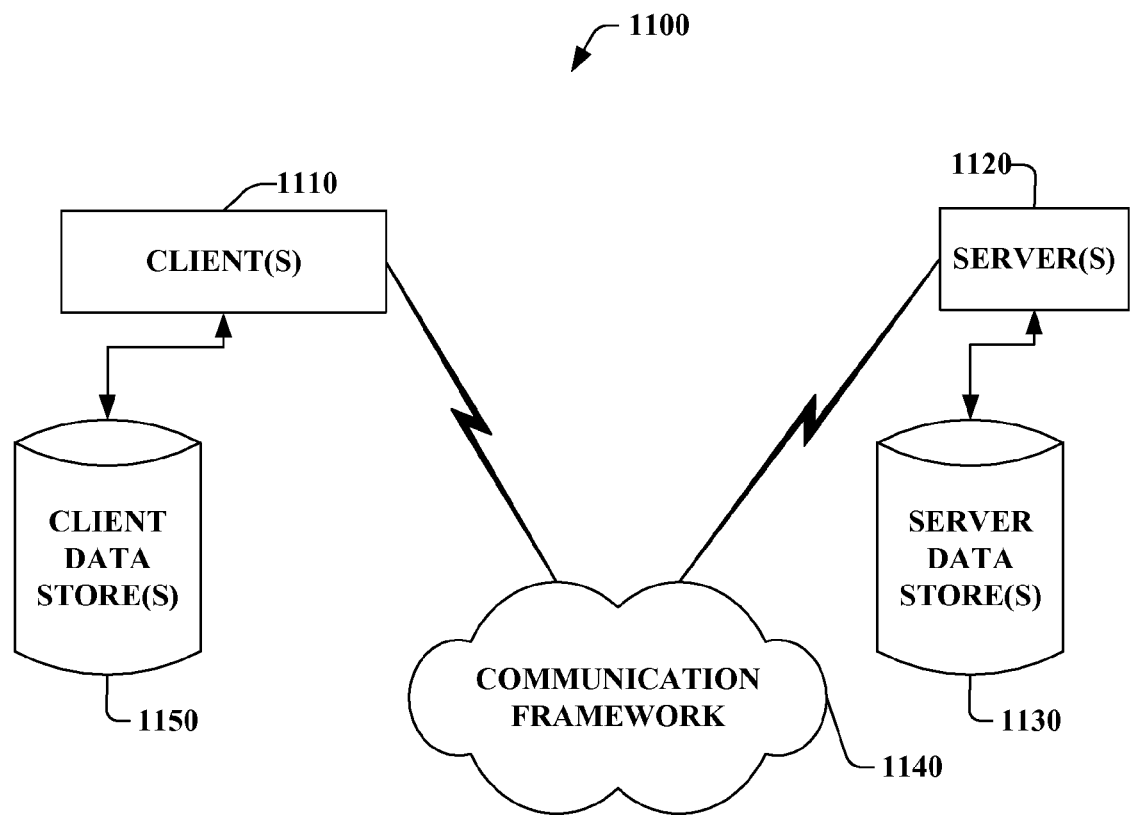
FIG. 11 is an exemplary computing environment that can be utilized in connection with the claimed subject matter.
Figure 12:
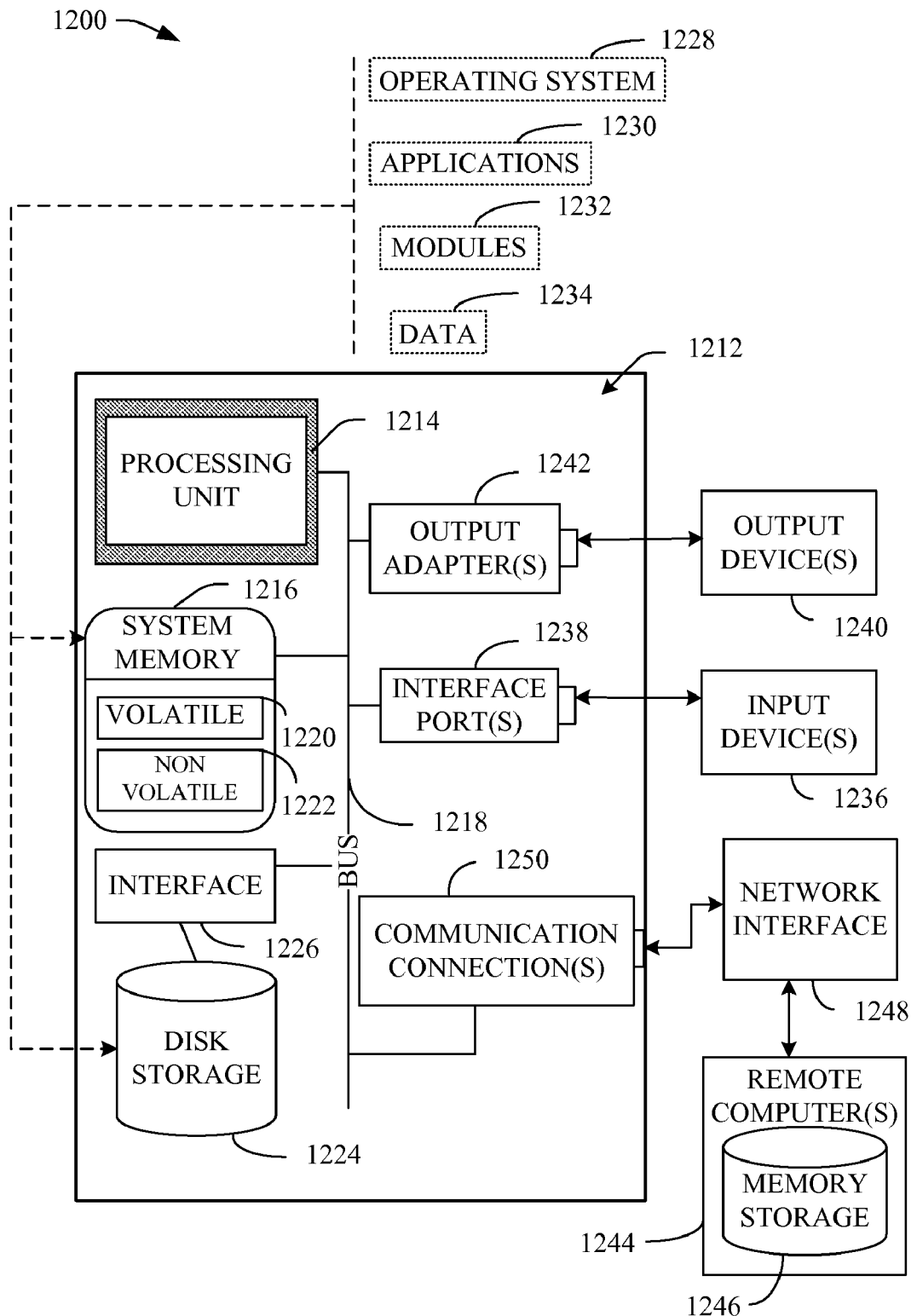
FIG. 12 is an exemplary networking environment that can be utilized in connection with the claimed subject matter.

In order to provide additional context for implementing various aspects of the claimed subject matter, FIGS. 11-12 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 11 is a schematic block diagram of a sample-computing environment 1100 with which the claimed subject matter can interact. The system 1100 includes one or more client(s) 1110. The client(s) 1110 can be hardware and/or software (e.g., threads, processes, computing devices). The system 1100 also includes one or more server(s) 1120. The server(s) 1120 can be hardware and/or software (e.g., threads, processes, computing devices). The servers 1120 can house threads to perform transformations by employing the subject innovation, for example.

One possible communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1150 that can be employed to store information local to the client(s) 1110. Similarly, the server(s) 1120 are operably connected to one or more server data store(s) 1130 that can be employed to store information local to the servers 1120.

With reference to FIG. 12, an exemplary environment 1200 for implementing various aspects of the claimed subject matter includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), or flash memory. Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchronous-link DRAM (SLDRAM), Rambus direct RAM (RDRAM), direct Rambus dynamic RAM (DRDRAM), MRAM, and Rambus dynamic RAM (RDRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the claimed subject matter can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates updating data within an industrial environment, comprising:
   a controller, residing within the industrial environment, that executes with a real-time operating system such that the controller includes two or more controller engine instances executing as processes on the controller; and,
   at least one processor that executes the following computer executable components stored on at least one computer readable medium:
      a detect component that evaluates one or more entities within the industrial environment; and
      an update component that identifies a portion of data to be deployed within the industrial environment based on the evaluation by the detect component and dynamically deploys the portion of data to at least a portion of the industrial environment, the portion of data is deployed within an isolated controller engine instance, isolated from at least the portion of the industrial environment, for testing prior to exposing such portion of data outside the isolated controller engine instance execution space and prior to deploying the portion of data to at least the portion of the industrial environment, where the execution space outside the isolated controller engine instance during testing is unaffected.

2. The system of claim 1, the portion of data is provided by at least one of a user, an entity, a group, a facility, an enterprise, a business, a factory, a collection of machines, a collection of computers, a collection of users, a programmer, a machine, a computer, a disparate industrial environment, a third-party, a vendor, the Internet, a network, a disparate network not affiliated with the industrial environment, or an evaluation of an industrial environment to ascertain data needs.

3. The system of claim 1, the portion of data relates to an entity within the industrial environment, the entity is a controller, a controller engine instance, a device, a portion of a process, or a portion of an application.

4. The system of claim 1, the portion of data is versioning data, firmware data, a portion of an update, a portion of a patch, a portion of updated software, a portion of updated firmware, a portion of code, a portion of data that corrects a defect, disparate data in comparison to existing data within the industrial environment, application updates, process updates, or an upgrade related to data within the industrial environment.

5. The system of claim 1, wherein the detect component identifies at least one of the following: a portion of data existent within the industrial environment; a portion of data within the industrial environment that can be updated; or a portion of data within the industrial environment that includes an update corresponding to such portion of data.

6. The system of claim 1, further comprising a distributed controller engine instance that concurrently executes on a portion of the controller and a portion of a disparate controller within the industrial environment.

7. The system of claim 1, wherein the detect component identifies at least one of a brand, a type, a model, a maker, a vendor, a serial number, a digital signature, a reference name, or a characteristic associated with the one or more entities to distinguish from a disparate entity, and to facilitate identification of the portion data.

8. The system of claim 1, the update component tests the portion of data on at least one of the following: an isolated controller engine instance substantially similar to a target controller engine instance that is exposed to the industrial environment; an isolated controller engine instance generated to replicate a target controller engine instance to which the portion of data is to be utilized; an existent controller engine instance within the industrial environment; or a secondary controller engine instance utilized as a redundant back-up for a primary controller engine instance.

9. The system of claim 1, the update component employs at least one of the following: a dynamic hand-off for the portion of data from an isolated controller engine instance to a non-isolated controller engine instance that has execution space exposed to the industrial environment; a direct install and exposure of the portion of data to the industrial environment including a manipulation to the portion of data indicated from testing; or a dynamic exchange of control between an isolated controller engine instance with the portion of data and a controller engine instance exposed within the industrial environment.

10. The system of claim 1, the update component implements an approval period prior to the deployment and exposure of the portion of data to the industrial environment, the approval period verifies a result associated with testing.

11. The system of claim 1, further comprising a balance component that allocates a load related to the industrial environment to at least one of a controller or a controller engine instance, where a load is at least one of a device, a set of devices, a process, or an application, the update component evaluates the load to facilitate determination of the portion of data.

12. The system of claim 11, the update component employs testing with a portion of data related to the load, the testing is isolated to execution space associated with the load.

13. The system of claim 1, the update component deploys the portion of data to a controller engine instance within the industrial environment based upon a hierarchical representation of devices, the hierarchical representation of devices is based at least in part upon one of a proprietary standard or an industry standard, which is at least one of ISA S95, or ISA S88.

14. The system of claim 13, the hierarchical representation is based at least in part upon the partitioning utilized by a balance component.

15. The system of claim 1, further comprising a security component that defines at least one of a security level, an authorization, or a privilege that corresponds to at least one of the controller engine instance, the portion of data, or an isolated controller engine instance.

16. The system of claim 1, further comprising a search component that facilitates querying data associated with at least one of the controller, the controller engine instance, the controller engine instance priority, or data related to the industrial environment.

17. The system of claim 1, further comprising a log component that tracks data related to at least one of the controller, the controller engine instance, the portion of data, an isolated controller engine instance, or identified data existent within the industrial environment.

18. The system of claim 1, further comprising a bridge component that provides a first network protocol utilized to carry data from the update component and configures the data for transmittal over a second network protocol.

19. The system of claim 18, the bridge component bridges multiple communication networks.

20. The system of claim 18, the first network protocol is at least one of Common Industrial Protocol (CIP), Fieldbus, Profibus, Hart, Modbus, ASI-bus, or Foundation Fieldbus.

21. The system of claim 20, the second network protocol is at least one of Common Industrial Protocol (CIP), Fieldbus, Profibus, Hart, Modbus, ASI-bus, or Foundation Fieldbus.

22. A method that facilitates dynamically deploying data within an industrial environment, comprising:
- employing a controller with a real time operating system in an industrial environment;
- executing at least one or more controller engine instances as processes on the controller;
- utilizing at least one controller engine instance to manage at least one of a device or a portion of a process within the industrial environment; and
- employing at least one processor to execute computer executable instructions stored on at least one computer readable medium to perform the following acts:
  - evaluating one or more entities within the industrial environment, the evaluating includes evaluating load data associated with the one or more entities;
  - identifying a portion of data to be deployed in at least a part of the industrial environment based in part on the evaluation;
  - deploying the portion of data within an isolated controller engine instance, isolated from at least the part of the industrial environment, prior to deploying the portion of data to at least the part of the industrial environment; and
  - testing the portion of data on the isolated controller engine instance prior to exposing the portion of data outside the isolated controller engine instance.

23. The method of claim 22, wherein the evaluating includes identifying at least one of a brand, a type, a model, a maker, a vendor, a serial number, a digital signature, a reference name, associated firmware on the one or more entities, existing firmware on the one or more entities, an existence of any portion of firmware on the one or more entities, a characteristic associated with the one or more entities to distinguish from a disparate entity, to facilitate identification of the portion data.

24. The method of claim 22, further comprising:
- dynamically handing-off for the portion of data from an isolated controller engine instance to a non-isolated controller engine instance that has execution space exposed to the industrial environment;
- directly installing and exposing the portion of data to the industrial environment including a test-based manipulation to the portion of data; and
- dynamically exchanging control between an isolated controller engine instance with the portion of data and a controller engine instance exposed within the industrial environment.

25. A computer-implemented system that facilitates implementing a portion of data within an industrial environment, comprising:
- at least one processor;
- at least one computer readable storage medium storing computer executable instructions that when executed by the at least one processor implement components comprising:
  - means for controlling at least a portion of an industrial environment by employing a real time operating system;
  - means for executing two or more controller engine instances as processes on the means for controlling;
  - means for evaluating one or more entities within the industrial environment, including evaluating load data associated with the one or more entities;
  - means for identifying a portion of data to update at least a part of the industrial environment based on the evaluation, the means for identifying dynamically deploys the portion of data within the industrial environment; and
  - means for testing the portion of data within at least one of the two or more controller engine instances, which is isolated from at least the part of the industrial environment, prior to exposing such portion of data to the part of the industrial environment outside the controller engine instance execution space.

* * * * *